United States Patent [19]
Nakajima

[11] Patent Number: 6,057,905
[45] Date of Patent: *May 2, 2000

[54] LIQUID CRYSTAL DISPLAY ELECTRODE WITH A SLIT FORMED AROUND THE PERIPHERY TO SHIELD THE INNER PORTION FROM EXTERNAL ELECTRIC FIELDS

[75] Inventor: Mutsumi Nakajima, Nara, Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/161,484

[22] Filed: Sep. 28, 1998

[30] Foreign Application Priority Data

Oct. 6, 1997 [JP] Japan .................................... 9-273165

[51] Int. Cl.[7] ............................................... G02F 1/1343
[52] U.S. Cl. ........................ 349/146; 349/142; 349/110
[58] Field of Search ................... 349/142, 146, 349/110

[56] References Cited

U.S. PATENT DOCUMENTS 5,058,996  10/1991  Washizuka et al. ...................... 359/89
5,646,705  7/1997  Higuchi et al. .......................... 349/143

FOREIGN PATENT DOCUMENTS

| 405289101 | 4/1992 | Japan | G02F 1/136 |
| 407181493 | 12/1993 | Japan | G02F 1/1337 |
| 6-281959 | 10/1994 | Japan . | |
| 07013164 | 1/1995 | Japan . | |

*Primary Examiner*—William L. Sikes
*Assistant Examiner*—Heidi L. Eisenhut
*Attorney, Agent, or Firm*—Nixon & Vanderhye, P.C.

[57] ABSTRACT

A liquid crystal display device includes: a first substrate having a first electrode; a second substrate, disposed so as to face the first substrate, having a second electrode; and a liquid crystal layer, including liquid crystal molecules, interposed between the first and second substrates, with a plurality of pixels being defined therein in a matrix pattern. The liquid crystal molecules in the liquid crystal layer are oriented in a direction substantially vertical to a surface of the substrates in the absence of an applied voltage across the liquid crystal layer. The first electrode of the first substrate includes a first slit at least in a portion of a periphery of each pixel, the first slit substantially dividing the first electrode into an inner electrode portion and an outer electrode portion, whereby the outer electrode portion shields the inner electrode portion from an electric field coming from an outside of the first electrode.

4 Claims, 11 Drawing Sheets

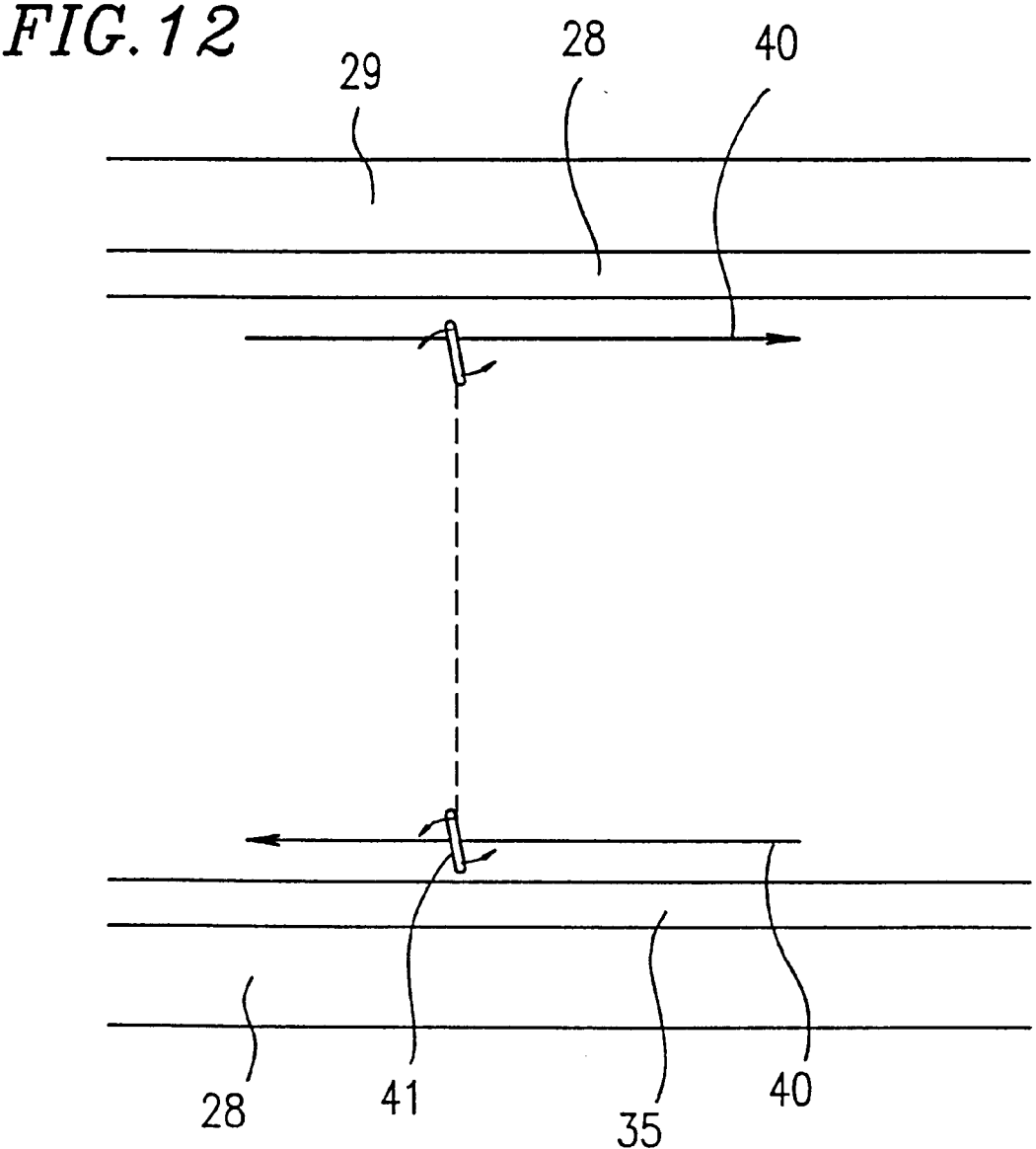

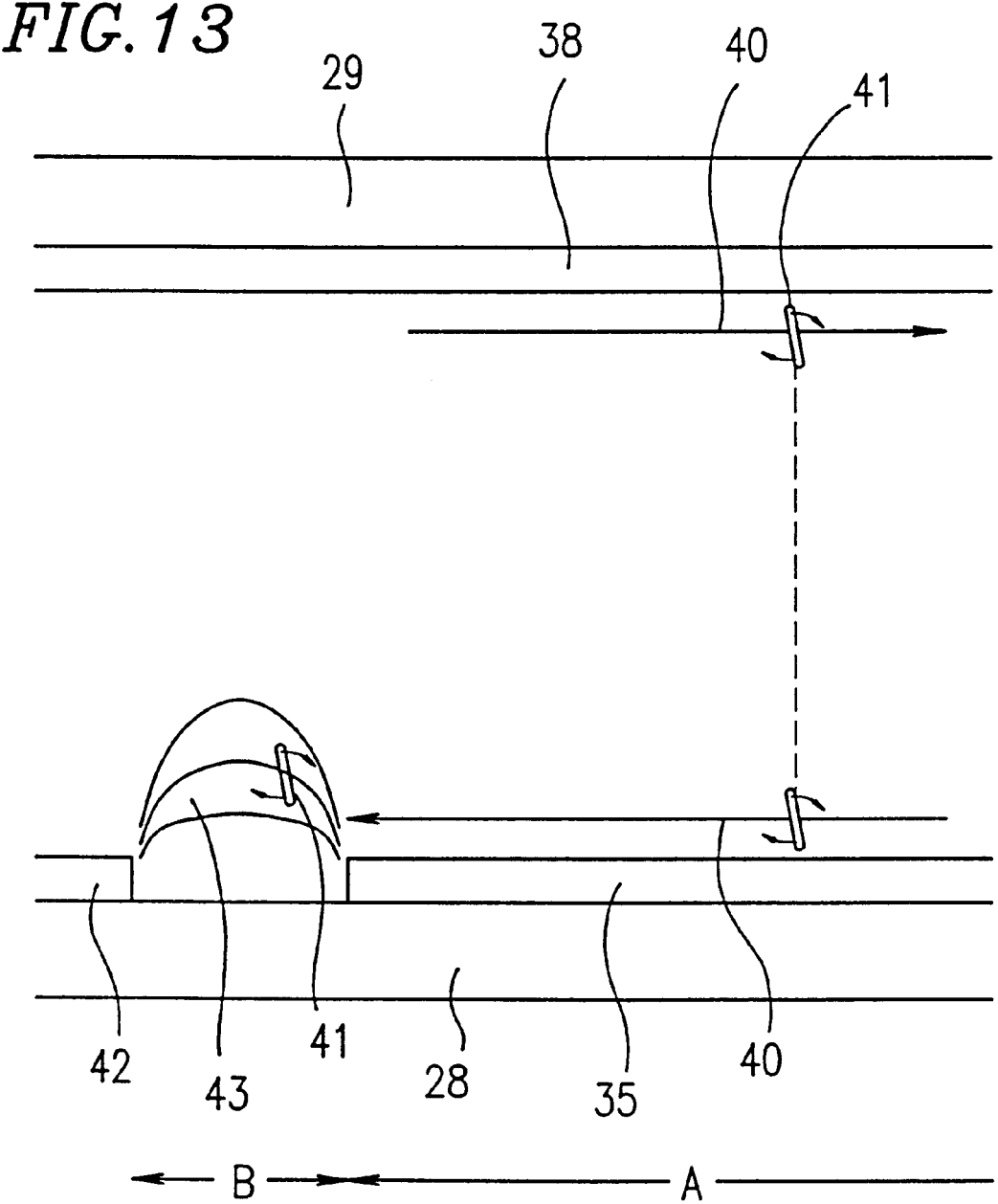

LIQUID CRYSTAL DISPLAY ELECTRODE WITH A SLIT FORMED AROUND THE PERIPHERY TO SHIELD THE INNER PORTION FROM EXTERNAL ELECTRIC FIELDS

BACKGROUND OF THE INVENTION

1. Field of the Invention

The present invention relates to a liquid crystal display device for use in a television set, a personal computer, a word processor, an OA equipment, or the like.

2. Description of the Related Art

A matrix-type liquid crystal display device is known in the art. As schematically illustrate in FIG. 8, the liquid crystal display device includes a matrix substrate 28, a counter substrate 29, a liquid crystal layer 27 interposed between the substrates 28 and 29, and a pair of polarizing plates 30 respectively provided on the substrates 28 and 29. The liquid crystal display device further includes a light source (i.e., a back light) 31 on the rear side of the device, so that the device functions as an optical shutter.

FIG. 9 is a plan view illustrating the matrix substrate 28. FIG. 10 is a plan view illustrating the counter substrate 29 viewed from the side of the matrix substrate 28.

The matrix substrate 28 includes gate lines 32 and source lines 33 crossing each other. A thin film transistor 34 as a switching element is provided in the vicinity of each intersection of the gate line 32 and the source line 33. Pixel electrodes 35 are provided in a matrix and each connected to the gate line 32 and the source line 33 via the thin film transistor 34. On the other hand, the counter substrate 29 includes a light blocking film 37 and a color filter (not shown). The light blocking film 37 includes openings 36 respectively corresponding to the pixel electrodes 35 on the matrix electrode 28. The counter substrate 29 further includes counter electrodes 38 disposed on the entire surface thereof. An alignment film (not shown) is provided on each of the matrix substrate 28 and the counter electrodes 29. The alignment film is subjected to a rubbing treatment so that liquid crystal molecules are aligned in a desired direction.

In the liquid crystal display device having such a structure, a voltage to be applied across each pixel through a corresponding portion of the liquid crystal layer 27 can be controlled by inputting an image signal to the corresponding pixel electrode 35 via the corresponding thin film transistor 34. When a voltage is applied across a portion of the liquid crystal layer 27, the orientation of the liquid crystal molecules in that portion of the liquid crystal layer 27 changes depending upon a dielectric anisotropy of the liquid crystal molecules.

Specifically, in a vertical orientation mode, the liquid crystal molecules are oriented in a substantially vertical direction in the absence of an applied voltage, and the liquid crystal molecules are inclined in a substantially horizontal direction in the presence of an applied voltage, using a liquid crystal material having a negative dielectric anisotropy. In order to have an uniform inclination of the liquid crystal molecules, the alignment film is subjected to a rubbing treatment. Thus, the liquid crystal molecules are inclined in a rubbing direction 40 in the presence of an applied voltage. The pair of polarizing plates 30 are arranged so that the respective absorption axes are at about 90° with respect to each other and at about 45° with respect to the rubbing direction 40.

The principle of light control of the above-explained liquid crystal display device is as follows.

Light from the back light 31 is polarized into linearly-polarized light by the polarizing plate 30 on the rear side (incident side) prior to being incident on the liquid crystal layer 27. In the absence of an applied voltage, the liquid crystal molecules are in a vertical orientation and have no phase difference. Thus, the liquid crystal layer 27 transmits the linearly-polarized light therethrough without changing its polarization axis so as to allow it to be incident upon the other polarizing plate 30 on the front side (output side). The perpendicularly arranged polarizing plate 30 on the front side absorbs the linearly-polarized light incident thereupon, thereby providing a black display.

In the presence of an applied voltage, on the other hand, the liquid crystal molecules are inclined at about 45° with respect to the polarization axis of the linearly-polarized light, which has passed through the polarizing plate 30 on the rear side, thereby providing a birefringence. Thus, the linearly-polarized light incident upon the liquid crystal layer 27 becomes elliptically-polarized light, circularly-polarized light, or linearly-polarized light whose polarization axis is shifted by about 90°. The polarizing plate 30 on the front side absorbs a component of the incident light along the absorption axis thereof, thereby changing the light transmittance of the device. The transmittance T in such a situation can be represented as follows:

$$T=\sin^2(\delta/2)$$

$$\delta=(2\pi/\lambda)\times\Delta n\times d.$$

Thus, a gray-scale display and a white display are realized. In the above expressions, $\Delta n$ denotes an apparent refractive index anisotropy of the liquid crystal, and d denotes a cell gap.

The apparent refractive index anisotropy is a refractive index anisotropy of the liquid crystal molecules in a plane parallel to the substrate surface (i.e., perpendicular to the light transmitting direction), and increases as the liquid crystal molecules are inclined toward the horizontal direction as the applied voltage increases. Therefore, it is possible to continuously change the light transmittance by changing the value of the applied voltage.

The above-described vertical orientation mode has a higher response speed than those of a TN (twisted nematic) mode or an STN (super twisted nematic) mode which are commonly employed, since the vertical orientation mode does not employ a twisted structure in the liquid crystal layer. Moreover, in the vertical orientation mode, a black display is obtained by applying no voltage, whereby there is no birefringence and no phase difference. Thus, light can be blocked by the pair of polarizing plates perpendicularly arranged to each other. Therefore, a high contrast can be easily obtained.

The liquid crystal display device as described above is advantageous in terms of the response speed and the contrast. However, it has a difficulty in uniformly controlling the orientation of the liquid crystal molecules in the presence of an applied voltage.

When an image displayed on such a conventional liquid crystal display device is observed, some "fuzziness" or "unevenness" may be recognized, indicating a poor display quality. When each pixel is further observed in detail with a loupe, display non-uniformity may be recognized as schematically illustrated in FIG. 11.

FIG. 11 illustrates liquid crystal molecules inclined radially about point A in the presence of an applied voltage, causing the display non-uniformity. It is believed that such display non-uniformity is observed due to a transverse electric field (an electric field having a component in a direction along the substrate surface) between the pixel electrode and the gate line or between the pixel electrode and the source line. This will be discussed below.

In the above-described liquid crystal display device, in the absence of an applied voltage, liquid crystal molecules 41 are generally oriented in a direction substantially perpendicular to the substrate surface, as illustrated in FIG. 12. Although the liquid crystal molecules 41 are slightly tilted along the rubbing direction 40 as a result of the rubbing treatment, this initial tilting angle is less than 10°. Thus, the generated phase difference is negligible with hardly any influence on the display quality.

In the presence of an applied voltage, e.g., when an electric field perpendicular to the substrate surface is created, the liquid crystal molecules 41 are inclined in a direction in which they are previously tilted (counterclockwise in FIG. 12).

However, in an actual liquid crystal display device, since the pixel electrode 35 is surrounded by peripheral electrode members 42 (e.g., a gate line, a source line, or the like), there occurs a transverse electric field 43, which is not perpendicular to the substrate surface, between the pixel electrode 35 and the peripheral electrode member 42. Accordingly, a moment acts upon the liquid crystal molecules 41 to rotate them in a direction perpendicular to the direction of the electric field. As a result, in region A in FIG. 13 over the pixel electrode 35, a moment acts upon the liquid crystal molecules 41 to rotate them in a counter-clockwise direction due to the initial inclination. In region B in the peripheral region of the pixel electrode 35, a moment acts upon the liquid crystal molecules 41 to rotate them in a clockwise direction.

The direction in which the liquid crystal molecules 41 are inclined is determined by the moment acting upon the liquid crystal molecules 41 and an elastic action between the adjacent liquid crystal molecules 41. In an actual liquid crystal display device, the liquid crystal molecules 41 in region B are at a large angle with respect to the direction of the electric field, whereas the liquid crystal molecules 41 in region A are at a small angle with respect to the direction of the electric field. Therefore, the moment acting upon the liquid crystal molecules 41 in region B is dominant. As a result, the liquid crystal molecules 41 rotate in a clockwise direction in both regions A and B.

Such a transverse electric field as described above occurs on each of the four sides around the pixel electrode 35. Thus, the liquid crystal molecules 41 are inclined toward an internal point within the pixel electrode 35, resulting in a radial distribution in the inclination direction about the internal point, which causes display non-uniformity.

Moreover, the respective internal points about which the distribution occurs are not positioned at positions corresponding to each other among the different pixel electrodes 35, whereby fuzziness is recognized when the entire screen is observed.

SUMMARY OF THE INVENTION

A liquid crystal display device of the present invention includes: a first substrate having a first electrode; a second substrate, disposed so as to face the first substrate, having a second electrode; and a liquid crystal layer, including liquid crystal molecules, interposed between the first and second substrates, with a plurality of pixels being defined therein in a matrix pattern. The liquid crystal molecules in the liquid crystal layer are oriented in a direction substantially vertical to a surface of the substrates in the absence of an applied voltage across the liquid crystal layer. The first electrode of the first substrate includes a first slit at least in a portion of a periphery of each pixel, the first slit substantially dividing the first electrode into an inner electrode portion and an outer electrode portion, whereby the outer electrode portion shields the inner electrode portion from an electric field coming from an outside of the first electrode.

The second electrode of the second substrate may include a second slit corresponding to the first slit in the first electrode of the first substrate.

The function of the present invention will be described below.

According to the present invention, an electrode on one of a pair of substrates includes a slit in at least a portion along the periphery of each pixel. An outer electrode portion, which exists between the slit and the edge of the electrode, shields an inner electrode portion from an electric field (transverse electric field) coming from the outside of the electrode.

The liquid crystal molecules in the liquid crystal layer interposed between the substrates are oriented in a direction substantially vertical to a surface of the substrate. When there exists a transverse electric field between the electrode and peripheral electrode members (e.g., a gate line or a source line), the liquid crystal molecules are usually inclined due to the influence of the transverse electric field. However, in accordance with the present invention, the transverse electric field is shielded by the outer electrode portion as set forth in the above and, consequently, the liquid crystal molecules over the inner electrode portion can be inclined uniformly in a direction as predetermined by the rubbing direction, thereby providing a good display quality without fuzziness.

The electrode of the other substrate may also include a slit corresponding to the above-mentioned slit on the opposing substrate. In such a case, the liquid crystal molecules interposed between the respective slits in the substrates remain in the vertical orientation. This blocks the elastic action from the liquid crystal molecules over the outer electrode portion, which would otherwise act upon the liquid crystal molecules over the inner electrode portion.

Thus, the invention described herein makes possible the advantage of providing a liquid crystal display device having a good display quality without fuzziness by providing a uniform inclination direction of the liquid crystal molecules in the presence of an applied voltage.

This and other advantages of the present invention will become apparent to those skilled in the art upon reading and understanding the following detailed description with reference to the accompanying figures.

BRIEF DESCRIPTION OF THE DRAWINGS

FIG. 12 is a cross-sectional view illustrating the orientation of liquid crystal molecules in a conventional liquid crystal display device; and FIG. 13 is a cross-sectional view illustrating the orientation of liquid crystal molecules in a conventional liquid crystal display device.

DESCRIPTION OF THE PREFERRED EMBODIMENTS

Figure 1:
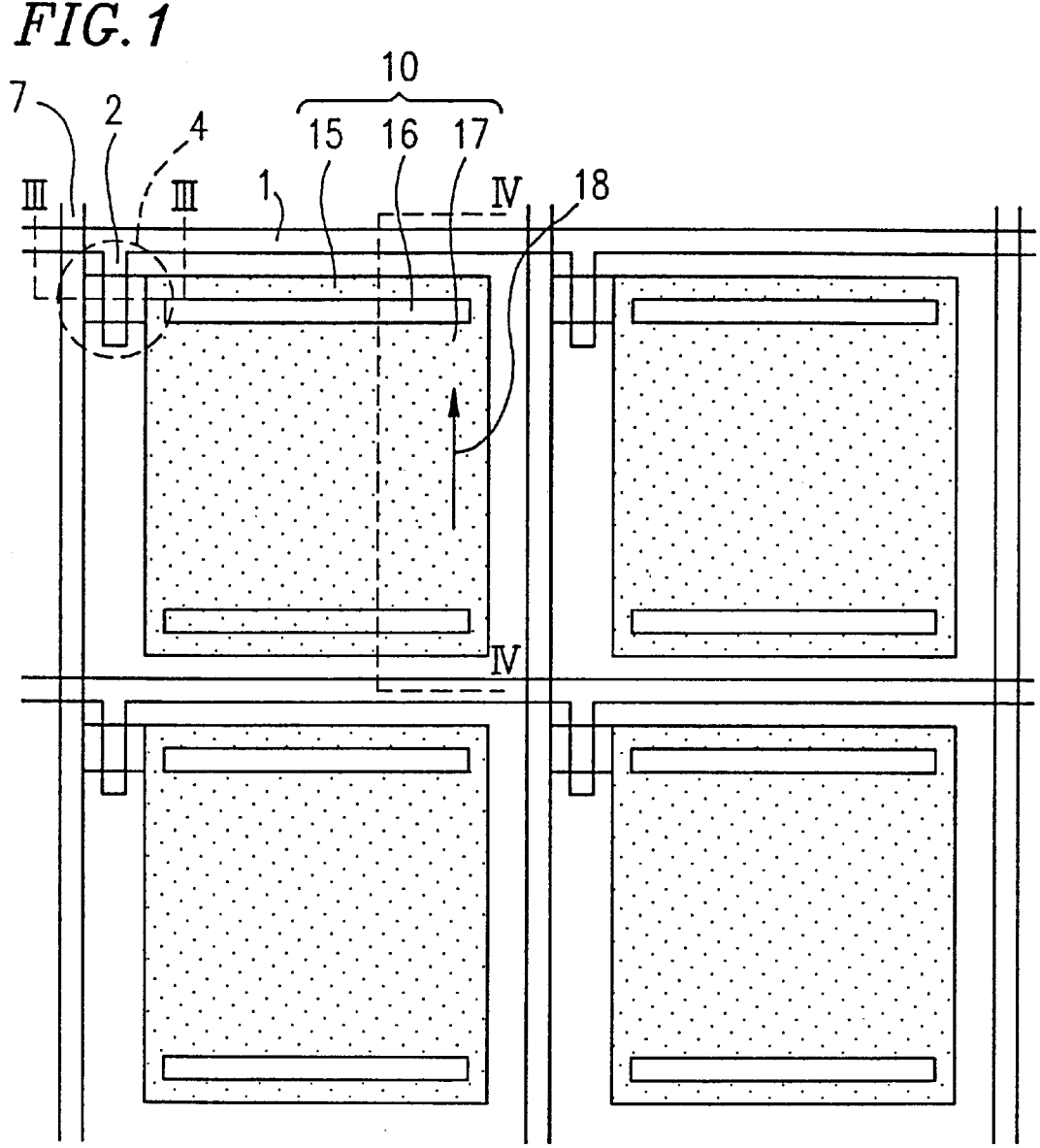
FIG. 1 is a plan view illustrating a matrix substrate according to Example 1 of the present invention.

The present invention will now be described by way of illustrative examples with reference to the accompanying figures. In the explanation, corresponding components are designated by the same reference numerals, and redundant explanation may be omitted.

EXAMPLE 1

A liquid crystal display device according to Example 1 of the present invention includes a matrix substrate, a counter substrate, a liquid crystal layer interposed between the substrates, and a pair of polarizing plates provided on the substrates, respectively. The liquid crystal display device further includes a light source (i.e., a back light) on the rear side of the device so as to function as an optical shutter.

Figure 2:
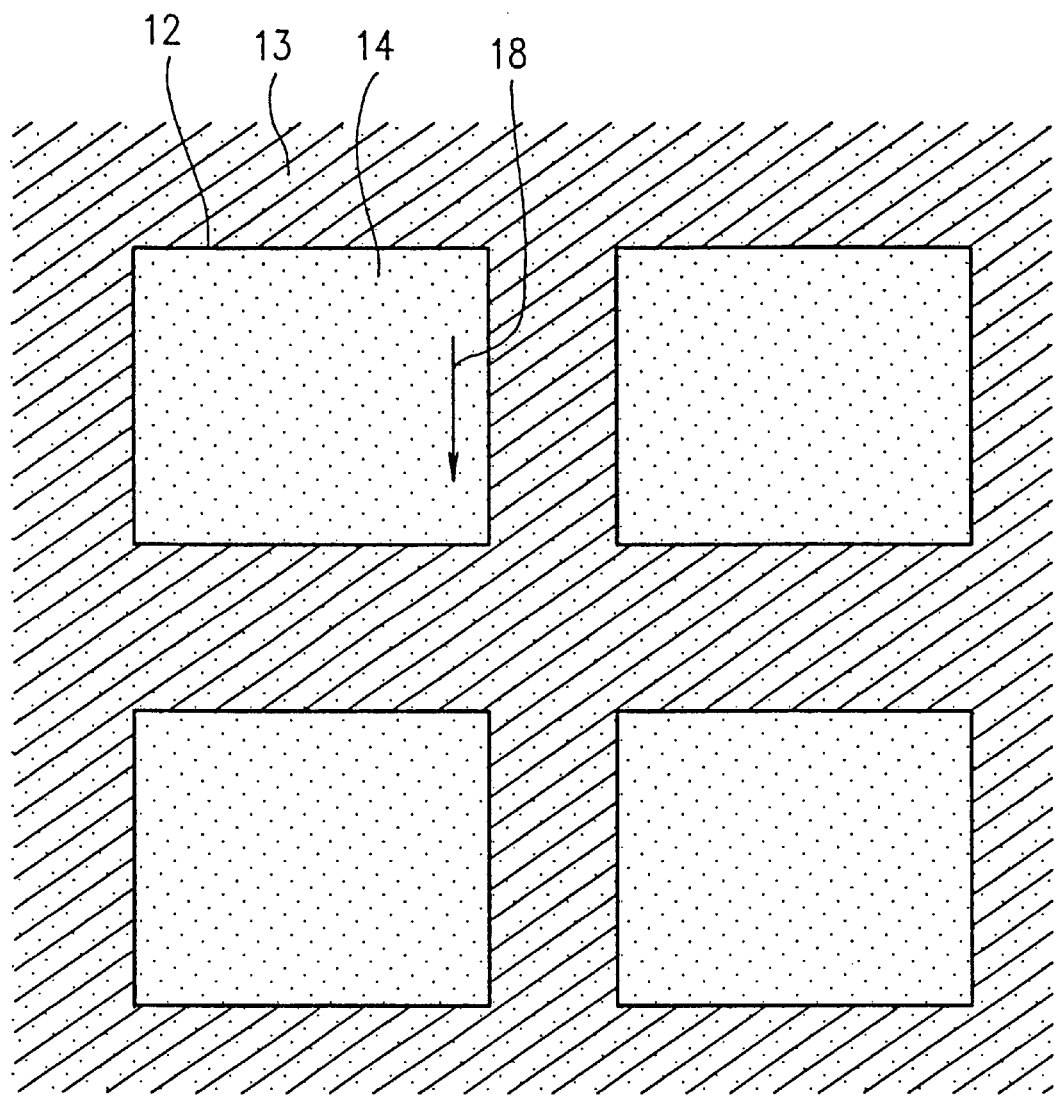
FIG. 2 is a plan view illustrating a counter substrate according to Example 1 of the present invention.
Figure 3:
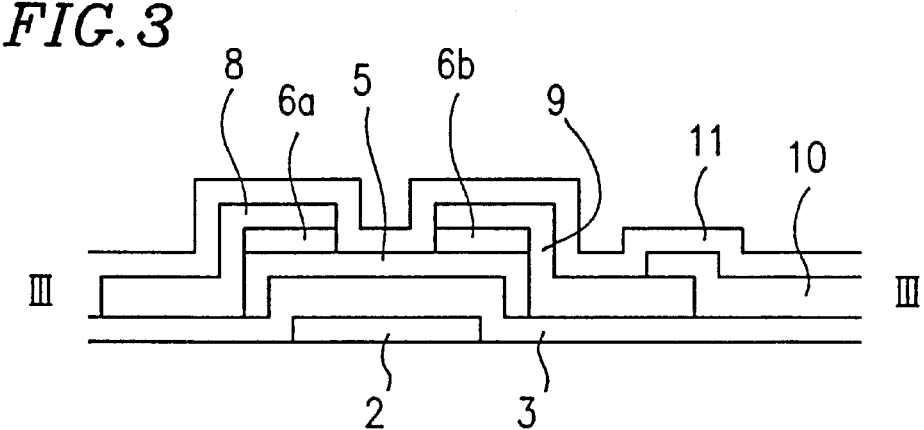
FIG. 3 is a cross-sectional view taken along line III—III in FIG. 1.

FIGS. 1 and 2 are plan views illustrating a matrix substrate and a counter substrate, respectively, according to Example 1 of the present invention. FIG. 3 is a cross-sectional view taken along line III—III in FIG. 1.

As shown in FIG. 1, the matrix substrate includes gate lines 1 and source lines 7 crossing each other. A thin film transistor 4 serving as a switching element is provided in the vicinity of each intersection of the gate line 1 and the source line 7. Pixel electrodes 10 provided in a matrix each include a slit 16 in a peripheral portion thereof. In the illustrated example, the slit 16 extends along each side parallel to the gate line 1. An outer electrode portion 15, which exists between the slit 16 and the edge of the pixel electrode 10, shields an inner electrode portion 17 from a transverse electric field coming from the adjacent gate line 1. The pixel electrodes 10 are each connected to the gate line 1 and the source line 7 via the thin film transistor 4.

On the other hand, as shown in FIG. 2 which illustrates the counter electrode as viewed from the side of the matrix substrate, the counter substrate includes a light blocking film 13 and a color filter (not shown). The light blocking film 13 includes openings 12 respectively corresponding to the inner electrode portions 17 of the pixel electrode 10 on the matrix substrate. The counter substrate further includes counter electrodes 14 disposed on the entire surface thereof. In FIG. 2, the dotted regions represent the counter electrodes 14, and the hatched region represents the area covered by the light blocking film 13.

An alignment film (not shown) is provided on each of the matrix substrate and the counter electrodes for vertically orienting the liquid crystal molecules in the absence of an applied voltage. The alignment film is subjected to a rubbing treatment so that the inclination direction of the liquid crystal molecules is uniform.

As illustrated in FIG. 3, the thin film transistor 4 includes a gate electrode 2 branching from the gate line 1 and a gate insulation film 3 covering the gate electrode 2. The thin film transistor 4 further includes an a-Si layer 5 provided on the gate insulation film 3 to be superimposed over the gate electrode 2, and an $n^+$-a-Si layer on the a-Si layer 5. The $n^+$-a-Si layer is divided into two portions 6a and 6b. A source electrode 8 branching from the source line 7 is provided on the $n^+$-a-Si layer 6a, while a drain electrode 9 is provided on the $n^+$-a-Si layer 6b. The pixel electrode 10 is provided to overlap the source electrode 8. A protective film 11 is provided to cover the entire structure.

The liquid crystal display device as set forth above of the present example may be produced as follows.

An exemplary production of the matrix substrate will be described first. A Ta film is deposited on a substrate by a sputtering method, and then patterned by a photolithography method so as to form the gate line 1 and the gate electrode 2 branching therefrom.

On the resulting structure, the gate insulation film 3 of $SiN_x$, an a-Si layer and a P-doped $n^+$-a-Si film are successively deposited by a PE-CVD (plasma enhanced chemical vapor deposition) method, and then patterned to form the a-Si layer 5 and the $n^+$-a-Si layers 6a and 6b.

Next, another Ti film is deposited by the sputtering method, and then patterned by the photolithography method so as to form the source line 7, the source electrode 8 branching therefrom, and the drain electrode 9. The same resist pattern may be used to etch away portions of the $n^+$-a-Si layers 6a and 6b extending beyond the source electrode 8 and the drain electrode 9, respectively.

Then, an ITO film is deposited by the sputtering method, and patterned to form the pixel electrode 10 which includes the slit 16 at least in a portion of the periphery of the pixel with an outer electrode portion 15 and an inner electrode portion 17 separated from each other by the slit 16.

In the present example, the slit 16 is formed along each of the sides of the pixel electrode 10 which are adjacent to the gate line 1. The slit 16 is formed with a width of about 3 $\mu$m, so as to leave the outer electrode potion 15 with a width of about 3 $\mu$m, for the following reasons.

Driving voltages of a liquid crystal display device are determined as follows. A source voltage is determined by the saturation voltage of the liquid crystal material used, and a gate voltage is determined by the operating voltage of the thin film transistor used. In the present example, a rectangular wave of up to about ±5 V is used as the source voltage, and a pulse wave is applied as the gate voltage such that a voltage of about +10 V (with respect to a reference voltage of about −15 V) is obtained during a scanning period. Accordingly, a strong electric field occurs particularly on the gate line 1 side. In view of the above, the outer electrode portion 15 is provided along each of the sides adjacent to the gate line 1.

After forming the pixel electrode 10, the protective film 11 of $SiN_x$ is formed using the PE-CVD method, thus completing the matrix substrate.

Now, an exemplary production of the matrix substrate will be described.

A color filter (not shown) is formed on the light blocking film 13 of Cr which includes the openings 12. Then, the counter electrodes 14 of ITO are formed thereon to respectively correspond to the pixels. In the present example, the counter electrode 14 includes no slit. The counter substrate may be produced prior to the aforementioned production of the matrix substrate.

An alignment film (not shown) is then applied by a printing method on each of the matrix substrate and the counter substrate, and subjected to a rubbing treatment. Then, the matrix substrate and the counter substrate are attached together. In the present example, a spacer (not shown) is provided between the matrix substrate and the counter substrate so as to provide a gap of about 4 μm between the pixel electrode 10 and the counter electrode 14. Moreover, in the present example, a rubbing direction 18 is set to a direction perpendicular to the gate line 1.

Finally, a liquid crystal material having a negative dielectric anisotropy is injected through an injection port (not shown) into the gap between the substrates. The injection port is then sealed, and a pair of polarizing plates are attached to the respective substrates. Thus, the liquid crystal display device of the present example is produced.

The pair of polarizing plates are arranged so that the respective absorption axes are at about 90° with respect to each other and at about 45° with respect to the gate line 1 (at about 45° with respect to the screen). Such arrangement realizes a normally black display where light is blocked when a vertical polarization condition is obtained in the absence of an applied voltage. Thus, a black display can be performed with no birefringence in the absence of an applied voltage, thereby increasing the contrast in a direction normal to the display plane. Moreover, since a twisted structure is not employed, the response speed can be increased.

Figure 4:
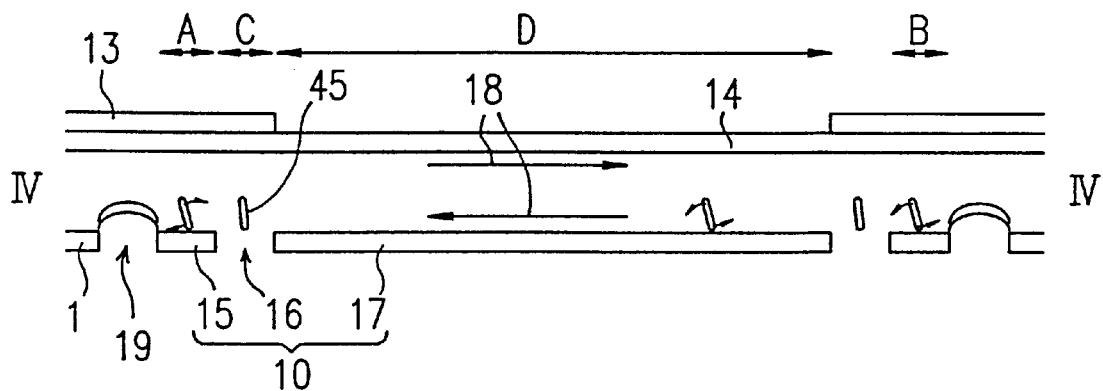
FIG. 4 is a cross-sectional view taken along line IV—IV in FIG. 1.

FIG. 4 is a cross-sectional view taken along line IV—IV in FIG. 1. Referring to FIG. 4, the inclination direction of the liquid crystal molecules when a voltage is applied to the produced liquid crystal display device will be described.

In the aforementioned liquid crystal display device, a transverse electric field 19 is created at the outer edge of the outer electrode portion 15, as illustrated in FIG. 4. Referring to FIG. 4, liquid crystal molecules 45 in region A rotate in a clockwise direction, while the liquid crystal molecules 45 in region B rotate in a counterclockwise direction. In region C (over the slit 16 in the pixel electrode 10), the electric field is weak both in the vertical direction and in the transverse direction, causing almost no inclination of the liquid crystal molecules 45 with respect to the vertical orientation. As a result, in region D (over the inner electrode portion 17) in each pixel, the liquid crystal molecules 45 are uniformly inclined in a counterclockwise direction (as predetermined by the rubbing direction). Since regions A, B and C are covered by the light blocking film 13 provided on the counter substrate, these regions do not influence the display.

When the liquid crystal display device of the present example is observed in detail with a loupe, the display non-uniformity, as recognized in the conventional liquid crystal display device, is not recognized. Moreover, fuzziness is not recognized when the entire screen is observed, indicating a good display quality.

EXAMPLE 2

Figure 5:
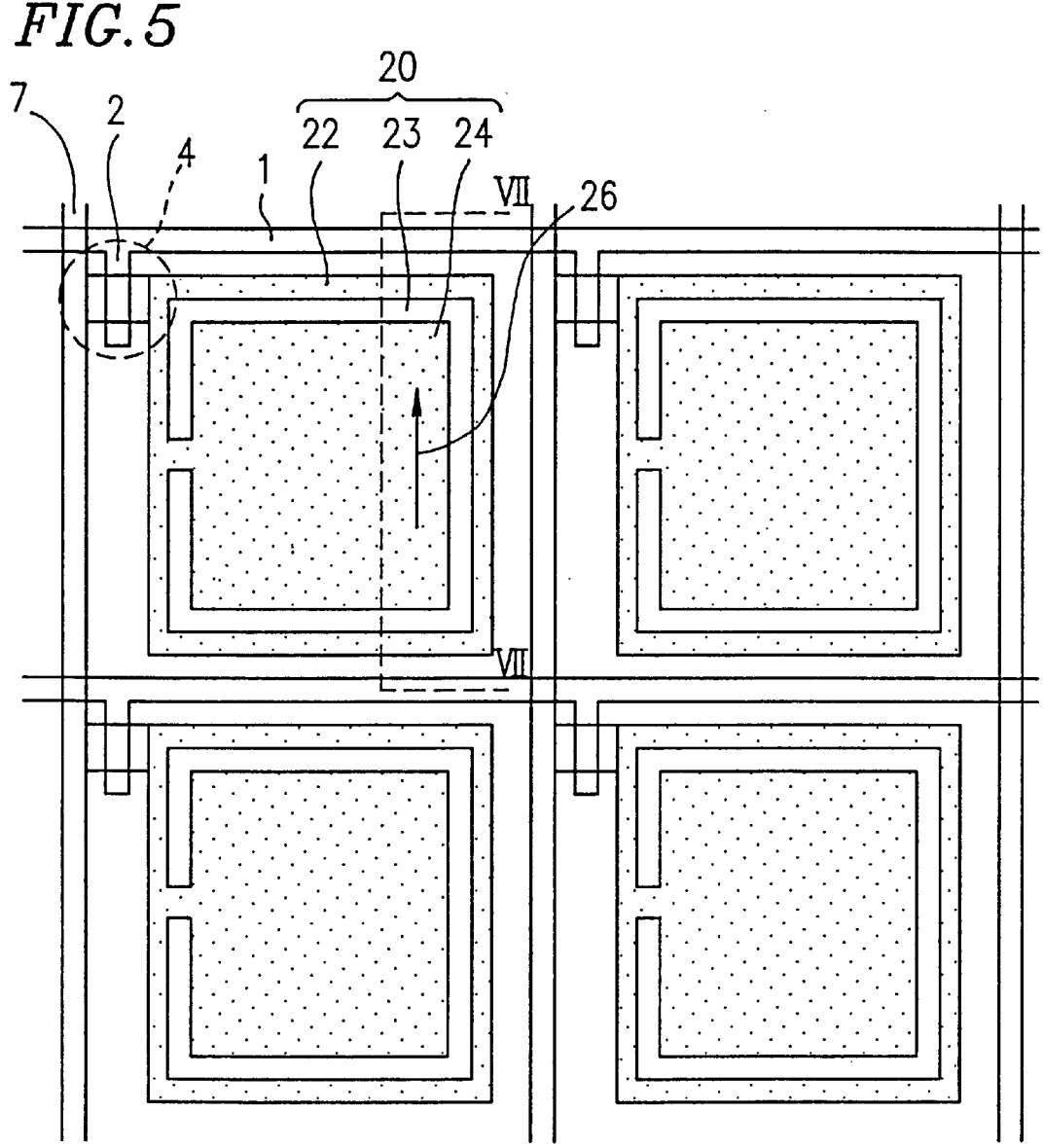
FIG. 5 is a plan view illustrating a matrix substrate according to Example 2 of the present invention.
Figure 6:
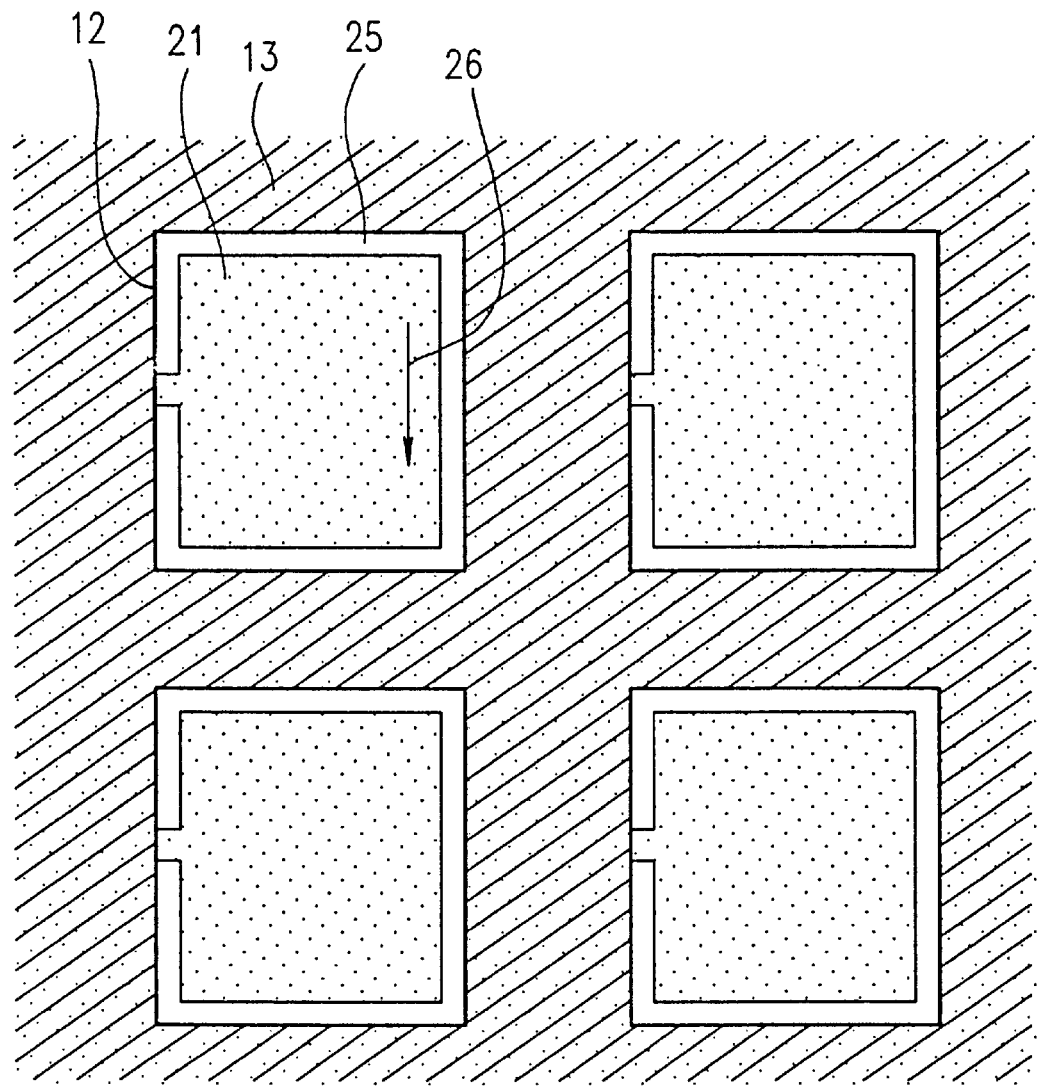
FIG. 6 is a plan view illustrating a counter substrate according to Example 2 of the present invention.

FIG. 5 is a plan view illustrating a matrix substrate according to Example 2 of the present invention. As illustrated in FIG. 5, a liquid crystal display device of the present example has a pixel electrode 20 including a slit 23, an outer electrode portion 22 and an inner electrode portion 24. Moreover, FIG. 6 is a plan view illustrating a counter substrate according to Example 2 of the present invention. As illustrated in FIG. 6, the counter substrate of the present example includes a counter electrode 21 having a slit 25. Other than the above, the liquid crystal display device of the present example is the same as that of Example 1.

The slit 23 is provided with a width of about 3 μm along the four sides of the pixel, except for a portion on one side adjacent to the source line 7 for establishing an electrical connection between the inner electrode portion 24 and the outer electrode portion 22. Between the slit 23 and the edges of the pixel electrode 20, an outer electrode portion 22 with a width of about 3 μm is provided.

Moreover, the slit 25 is also provided in the counter electrode 21 so as to correspond to the slit 23 in the pixel electrode 20, as illustrated in FIG. 6 in which the counter substrate is viewed from the side of the matrix substrate. In FIG. 6, the dotted regions represent the counter electrodes 21, and the hatched region represents the area covered by the light blocking film 13. As in Example 1, a rubbing direction 26 is set to a direction perpendicular to the gate line 1.

Figure 7:
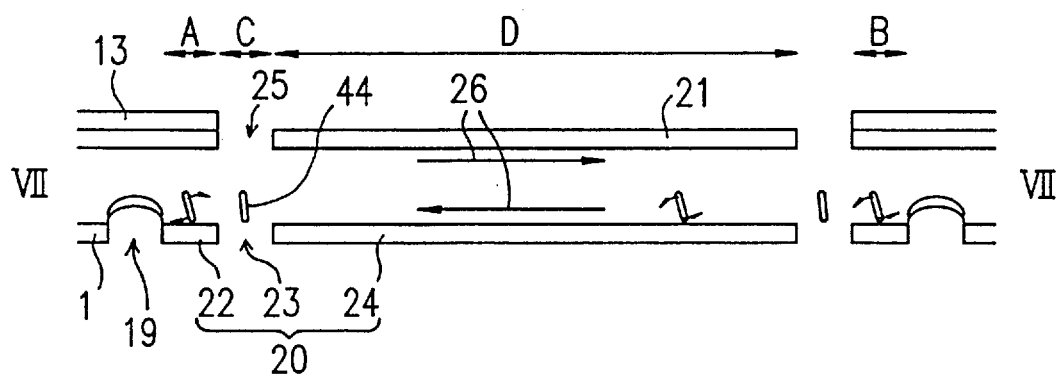
FIG. 7 is a cross-sectional view taken along line VII—VII in FIG. 5.
Figure 8:
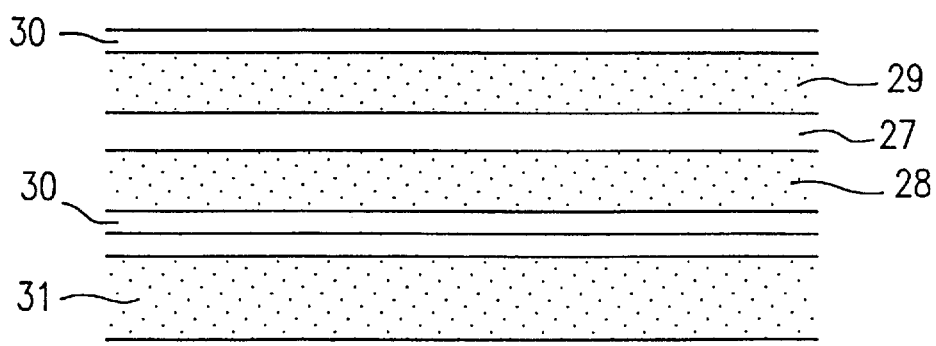
FIG. 8 is a cross-sectional view illustrating a conventional liquid crystal display device.
Figure 9:
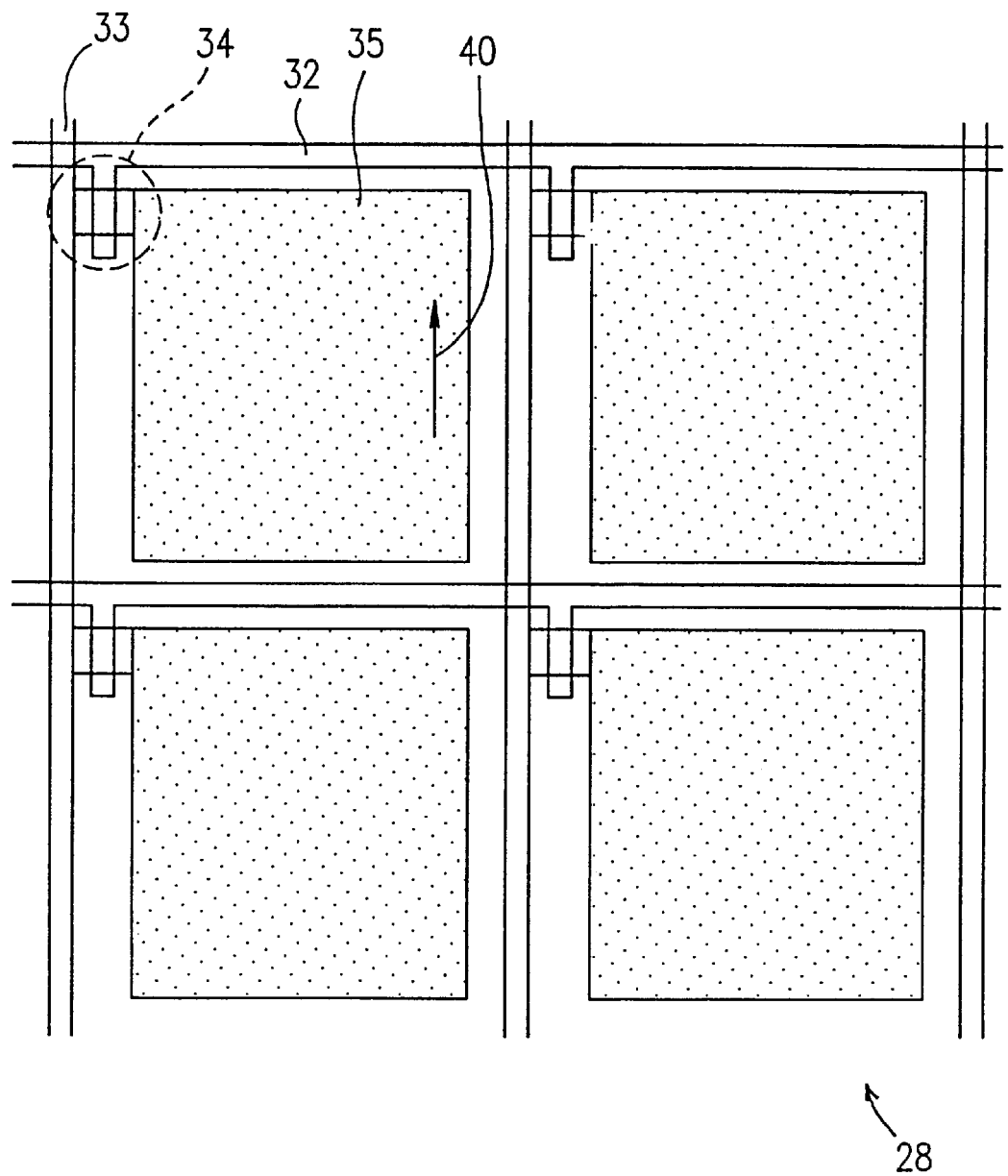
FIG. 9 is a plan view illustrating a conventional matrix substrate.
Figure 10:
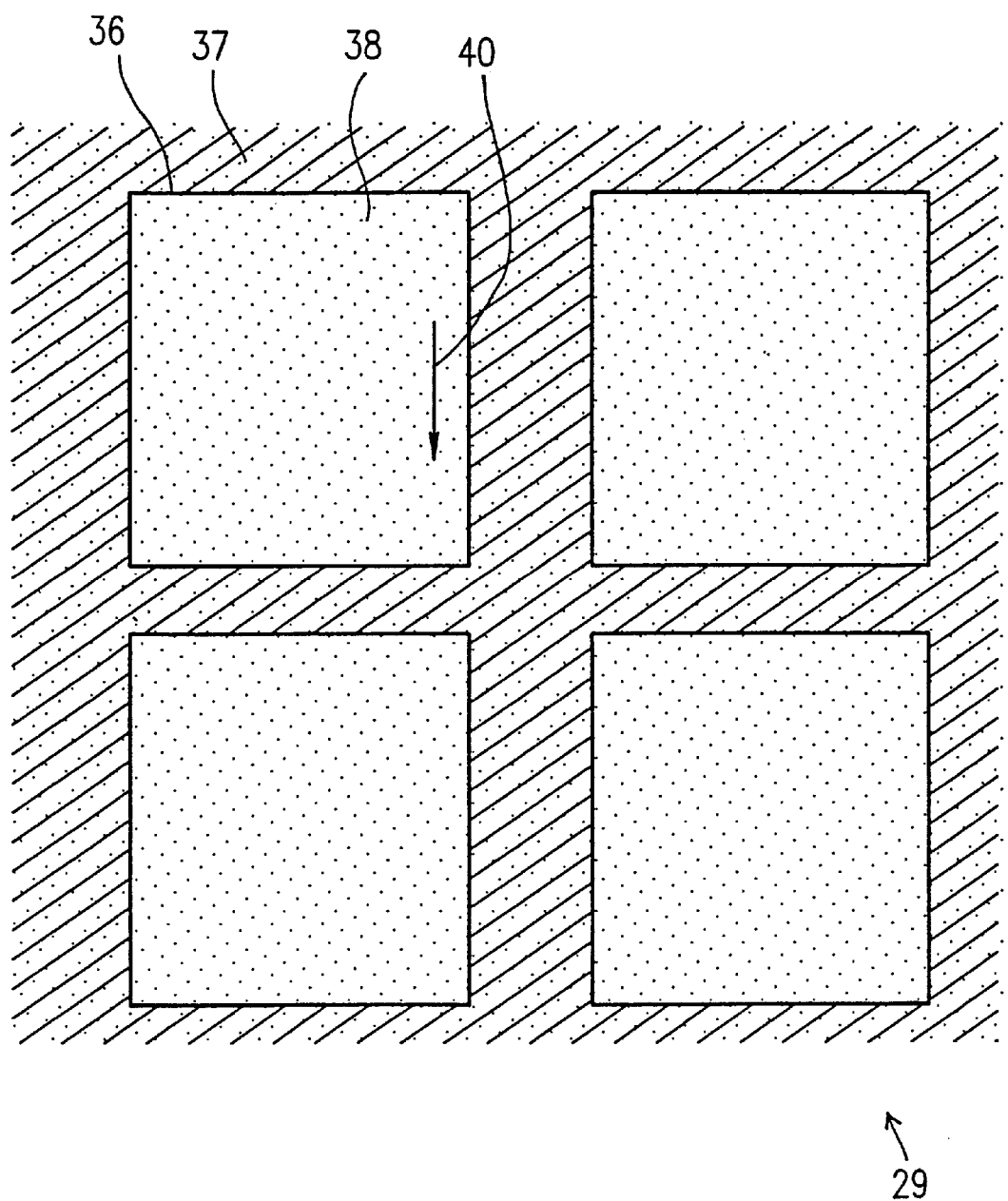
FIG. 10 is a plan view illustrating a conventional counter substrate.
Figure 11:
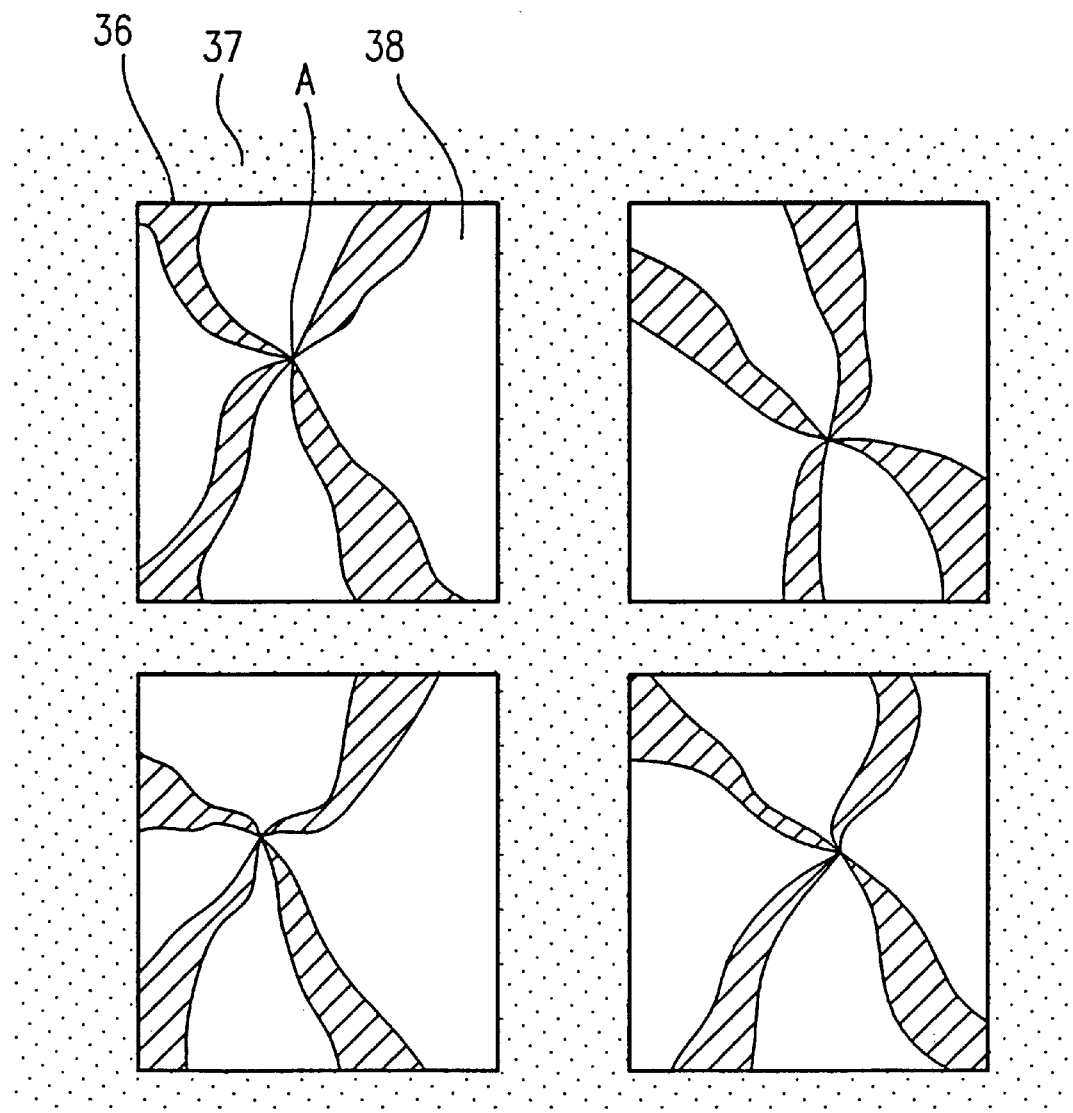
FIG. 11 is a diagram illustrating display non-uniformity observed in a conventional liquid crystal display device.

FIG. 7 is a cross-sectional view taken along line VII—VII in FIG. 5. Referring to FIG. 7, the inclination direction of the liquid crystal molecules when a voltage is applied to the liquid crystal display device will be described.

In the liquid crystal display device of the present example, the slit 25 is provided in the counter electrodes 21 so as to oppose the slit 23 in the pixel electrode 20. Therefore, there is no electric field in region C (over the slit 23 in the pixel electrode 20), whereby the orientation of the liquid crystal molecules 44 therein does not change from the vertical orientation. As a result, an elastic moment from the liquid crystal molecules 44 in regions A and B (over the outer electrode portion 22) can be substantially completely blocked. Thus, in region D (over the inner electrode portion 24), the liquid crystal molecules 44 can be uniformly inclined in a counterclockwise direction (as predetermined by the rubbing direction).

When the liquid crystal display device of the present example is observed, the display non-uniformity, as recognized in the conventional liquid crystal display device, is not recognized. Moreover, fuzziness is not recognized when the entire screen is observed, indicating a good display quality.

As described above, the display non-uniformity, as recognized in the conventional liquid crystal display device, is eliminated both in Example 1 and Example 2 of the present invention.

The orientation of liquid crystal molecules may vary depending upon an alignment film material, a liquid crystal material, a printing condition of the alignment film, a process condition (e.g., the sintering temperature), or the combination thereof. Thus, the position and/or the shape of the slit(s) of each electrode are not limited to those described above.

The pixel electrode and the counter electrode may take any other shape which improves the display uniformity. In addition, the slit in the pixel electrode or the counter electrode may be in a curved shape.

Moreover, while a thin film transistor is employed as a switching element in both liquid crystal display devices of the above examples, the present invention can be applied to a liquid crystal display device of other types including a plurality of pixels provided in a matrix pattern, for example, a liquid crystal display device employing binary-terminal elements (e.g., MIM elements) or a passive matrix type liquid crystal display device.

As described above, according to the present invention, in the vertical orientation mode which is advantageous in terms of the response speed and the contrast, the inclination direction of liquid crystal molecules within each pixel in the presence of an applied voltage is easily made uniform, by providing a slit while patterning a pixel electrode or a counter electrode. Thus, it is possible to obtain a liquid crystal display device which exhibits a smooth display quality without fuzziness in an image display.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:

a first substrate having a first electrode;

a second substrate, disposed so as to face the first substrate, having a second electrode; and a liquid crystal layer, including liquid crystal molecules, interposed between the first and second substrates, with a plurality of pixels being defined therein in a matrix pattern, wherein the liquid crystal molecules in the liquid crystal layer are oriented in a direction substantially vertical to a surface of the substrates in the absence of an applied voltage across the liquid crystal layer, and the first electrode of the first substrate includes a first slit at least in a portion of a periphery of each pixel, the first slit substantially dividing the first electrode into an inner electrode portion and an outer electrode portion, whereby the outer electrode portion shields the inner electrode portion from an electric field coming from an outside of the first electrode.

2. A liquid crystal display device according to claim 1, wherein the second electrode of the second substrate includes a second slit corresponding to the first slit in the first electrode of the first substrate.

3. A liquid crystal display device according to claim 1, further comprising:

a light blocking film provided on at least one of the first and second substrates to overlap with the outer electrode portion.

4. A liquid crystal display device according to claim 1, wherein the outer electrode portion functions as a pixel electrode.

* * * * *

UNITED STATES PATENT AND TRADEMARK OFFICE

CERTIFICATE OF CORRECTION

PATENT NO.   : 6,057,905
DATED        : May 2, 2000
INVENTOR(S)  : NAKAJIMA

It is certified that error appears in the above-identified patent and that said letters patent is hereby corrected as shown below:

On the front page under the section denoted by [*] and entitled "Notice:" delete the sentence "This patent is subject to a terminal disclaimer."

Signed and Sealed this

Fifteenth Day of May, 2001

Attest:

NICHOLAS P. GODICI

Attesting Officer *Acting Director of the United States Patent and Trademark Office*